US006237752B1

(12) United States Patent
El-Ibiary

(10) Patent No.: US 6,237,752 B1
(45) Date of Patent: May 29, 2001

(54) METHOD AND APPARATUS FOR DETECTING A MISALIGNED CONVEYOR

(75) Inventor: Yehia El-Ibiary, Simpsonville, SC (US)

(73) Assignee: Reliance Electric Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/408,009

(22) Filed: Sep. 29, 1999

(51) Int. Cl.⁷ ................................................. B65G 43/00
(52) U.S. Cl. .......................................................... 198/810.03
(58) Field of Search ........................................ 198/810.03

(56) References Cited

U.S. PATENT DOCUMENTS 3,874,790 * 4/1975 Jordan ............................. 198/810.03
5,157,444 * 10/1992 Mori et al. ..................... 198/810.03

* cited by examiner

Primary Examiner—Joseph E. Valenza
(74) Attorney, Agent, or Firm—Adam J. Forman; A. M. Gerasimow; John J. Horn

(57) ABSTRACT

A misaligned conveyor belt detection assembly is provided to determine when a conveyor has become misaligned. Specifically, a conveyor belt is placed in contact with a contact apparatus that produces indications, such as heat and/or vibration that, when measured, are compared to corresponding threshold values to determine whether the conveyor belt has become misaligned. The assembly can then display a misalignment indication to a user stationed remotely from the conveyor.

17 Claims, 7 Drawing Sheets

METHOD AND APPARATUS FOR DETECTING A MISALIGNED CONVEYOR

BACKGROUND OF THE INVENTION

1. Field of the Invention

The present invention relates to conveyors and, more particularly, relates to a method and apparatus for detecting misalignment of a conveyor.

2. Discussion of the Related Art

A conveyor belt assembly typically comprises a plurality of pulleys, at least one of which is powered, that is mounted onto a frame, and an elastic material (or conveyor belt) that is wrapped around the pulleys. In the event that the conveyor belt assembly is being used to transport the load over long distances, additional support pulleys or rollers may be placed underneath the conveyor belt. The conveyor belt becomes operational when the pulleys rotate, thereby moving the conveyor belt forward.

In order to ensure that the force of the pulley will be sufficient to drive the conveyor belt, the conveyor belt is placed under tension so that friction between the conveyor belt and the drive pulley is sufficient to ensure that the conveyor belt does not slip against the surface of the pulley. The typical conveyor belt is therefore of an elastic material, such as a reinforced rubber composite. However, uneven loading of the belt, belt material inhomogeneity, and unequal temperature distribution across the belt can cause the belt to stretch unevenly, thereby causing the belt to slide laterally with respect to the pulleys and become misaligned during use, resulting in damaged belt edges and a shorter belt life. A misaligned belt could also, in some situations, damage the load.

Devices have been implemented in the past to detect a misaligned conveyor belt. One such device comprises a bronze disc that is placed adjacent at least one side of the belt such that, when the belt becomes misaligned, it rubs against the disc, thereby generating heat that is conducted through the disc. A thermocouple embedded in the disc measures the heat and outputs voltage signals to a programmable controller that processes the signals to measure the temperature. A threshold temperature is programmed into a human machine interface and communicated to the controller via an analog circuit such that, when the measured temperature exceeds the threshold temperature, the controller activates an alarm signal that is detectable by a user.

Several disadvantages are associated with this device. First, the output of this device requires a long response time in detecting the misalignment of the conveyor belt. Specifically, a significant amount of time elapses while frictional forces between the belt and disc generate heat and while the generated heat is conducted through the bronze disc to the thermocouple. During this delay, the conveyor belt may become increasingly misaligned. Additionally, no back-up sensors exist on this device to allow a user stationed at a location remote from a conveyor belt to make a reliable determination that the belt has become misaligned. For example, the user may be unsure that the temperature sensor is functioning properly. Finally, in order to test the operability of the sensor, the bronze disc must be manually heated until the measured temperature exceeds the threshold temperature. This process is cumbersome and inefficient.

The need has therefore arisen to provide a method and apparatus for detecting a misaligned conveyor belt with a quick response time that incorporates back-up features, and allows a user to easily perform diagnostics to ensure the operability of the detection apparatus.

OBJECTS AND SUMMARY OF THE INVENTION

It is therefore a first object of the present invention to provide a method and apparatus for detecting a misaligned endless conveyor, such as a conveyor belt, with a quick response time.

It is a second object of the invention to provide a misaligned conveyor detection assembly that provides more than one indication of whether the conveyor is misaligned.

It is a third object of the invention to provide a misaligned conveyor detection assembly that is connected to a communication network to allow real time adjustment of threshold values to perform diagnostics, to reduce wiring costs, and to increase the reliability of the system by having fewer connectors and cables.

It is a fourth object of the invention to provide a misaligned conveyor detection assembly that permits automatic termination of conveyor operation if the conveyor becomes misaligned.

In accordance with a first aspect of the invention, when used in conjunction with an endless conveyor belt, a misaligned conveyor belt detection assembly comprises a misalignment contact apparatus that is positioned adjacent at least one edge, and preferably both edges, of a conveyor belt. The misalignment contact apparatus preferably comprises a thermally conductive material, such as a bronze disc, with an embedded heat sensor, such as a thermocouple, to measure the heat generated during operation of the conveyor. The heat sensor outputs voltage signals, corresponding to the measured temperature, to a network interface located within a housing. An insulation layer also may be positioned between the contact apparatus and the housing to minimize heat transfer to the housing. A mounting plate is disposed between the insulation layer and the contact apparatus. The housing, insulation layer, and mounting plate are all mechanically connected to one another, and the mounting plate is further connected to the contact apparatus on one side and to a frame on the other side.

When the conveyor belt becomes misaligned, it rubs against the contact apparatus, thereby causing it to vibrate. Because the housing is in mechanical communication with the contact apparatus, the housing also vibrates. A vibration sensor, such as an accelerometer, is disposed within the housing and outputs a signal indicative of a measured vibration level, which is sent to the network interface. Preferably, the network interface samples output from the vibration sensor at predefined time intervals, computes an average of the measured vibration values over that interval, and compares the average to a predetermined threshold level to determine whether the conveyor belt is misaligned. Because the vibration detection does not incorporate the time delays typically associated with thermal conduction, a fast response time is associated with the detection of the misaligned conveyor belt based on vibration.

The network interface may comprise a microprocessor that processes the measured temperature and vibration signals and computes respective measured temperature and vibration values. The microprocessor then compares these values with respective predetermined threshold values that are inputted into a human machine interface located remotely from the detection assembly.

In accordance with a second aspect of the invention, the network interface preferably comprises outputs that are connected via a serial communication link to indicate the status of the conveyor belt and reduce the wiring cost. In accordance with a preferred embodiment, independent temperature and vibration alarms, located on the human machine interface, are activated to indicate that the conveyor belt has become misaligned. Once both alarms are activated, the user may have conclusive grounds for determining that the conveyor belt has become misaligned. If, for example, the temperature alarm is activated without the vibration alarm, the user may elect to conduct further investigation before determining that the conveyor belt has become misaligned.

In accordance with a third aspect of the invention, the network interface and human machine interface may be connected to a serial communication network, thereby allowing a user to adjust the temperature and vibration threshold values by inputting the new values into the human machine interface. These values are then sent to the network interface. As a result, when testing the operability of the detection assembly, the temperature and/or vibration thresholds may be appropriately set such that the measured ambient values would trigger the alarm when the detection assembly is operational. Therefore, if the alarms are not triggered when the threshold values are adjusted, the user will know that the detection assembly is non-operational, and will be able to take appropriate corrective measures.

Additionally, the conveyor belt may become worn through use, and will therefore present progressively different vibration and temperature properties when it becomes misaligned. To accommodate for these changes, the user may adjust the threshold values to accommodate changes in conveyor properties.

In accordance with a fourth aspect of the invention, a controller may be connected to the network that is actuable to activate the alarms on the HMI and/or terminate operation of the conveyor belt when the vibration and/or temperature threshold values are exceeded. Specifically, when the microprocessor determines that the conveyor belt has become misaligned, it will send appropriate signals to the controller that is electrically connected to the HMI as well as a power source of the conveyor belt.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Pursuant to the preferred embodiment of the invention, a misaligned conveyor belt detection assembly is provided for use with a conveyor such as a conveyor belt, and provides an indication when the conveyor belt becomes misaligned with respect to the pulleys over which the conveyor belt travels, as would result from uneven loading. Specifically, a temperature sensor is embedded within a misalignment contact apparatus that is positioned adjacent at least one edge of the conveyor belt, and a vibration sensor is embedded within a housing that is in mechanical communication with the contact apparatus. These sensors output signals to a network interface that processes the signals to determine measured temperature and vibration values, and that compares these measured values to corresponding predetermined threshold values that are entered into a human machine interface and communicated to the network interface via a serial communication network. When the conveyor belt becomes misaligned, an edge of the belt will rub against the contact apparatus, thereby generating heat and vibrating the housing. The interface will detect the increase in the measured temperature and vibration, and will generate temperature and/or vibration alarm signal(s) when the threshold value(s) is/are exceeded. A controller will then activate the alarm(s) on a human machine interface (HMI). Because the network interface and HMI are connected to the serial communication network, a user is able to update the threshold values during operation.

Figure 1:
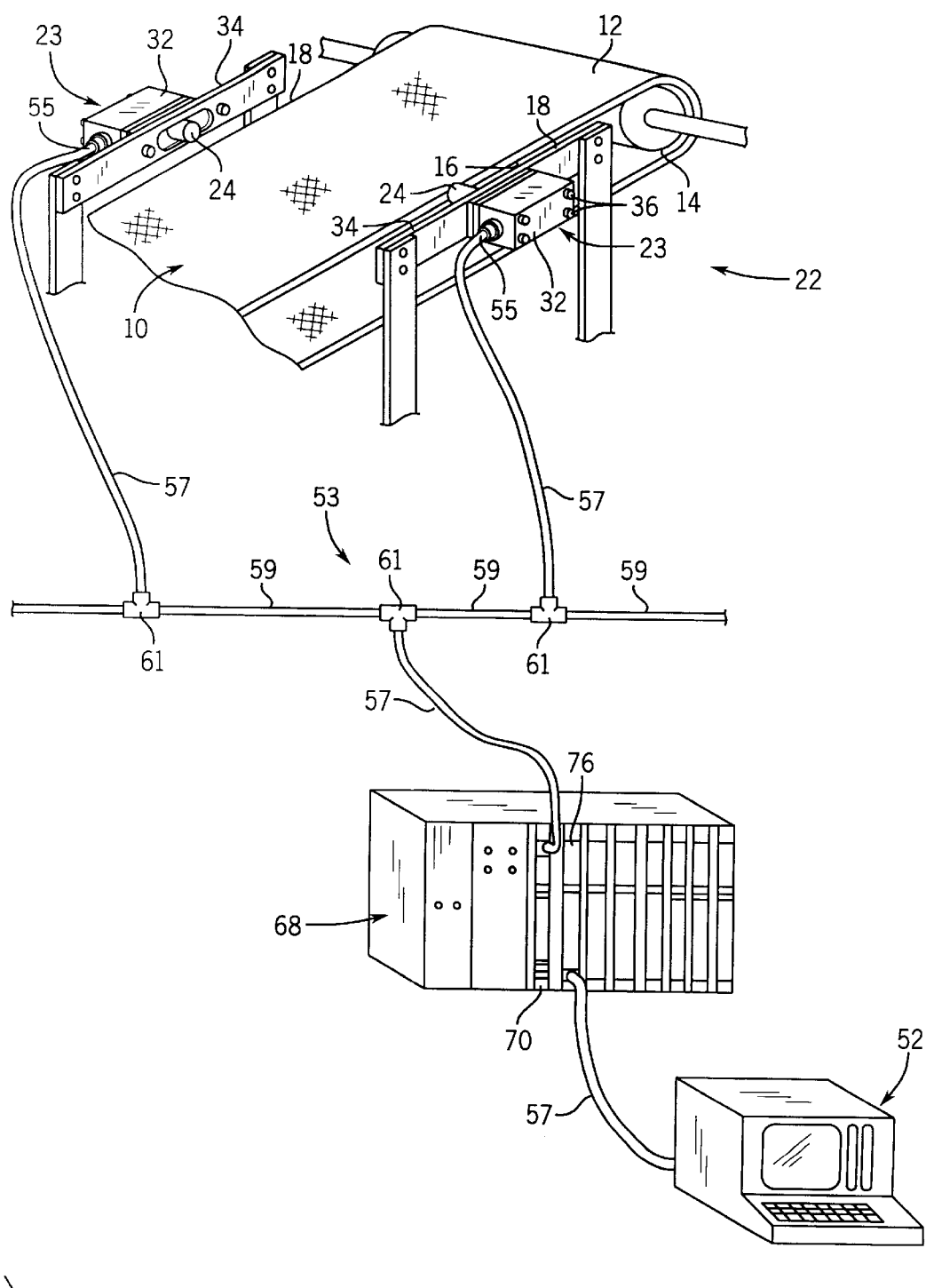
FIG. 1 is a fragmentary perspective view showing misaligned conveyor belt detection assembly and an associated conveyor belt in accordance with a preferred embodiment of the present invention.
Figure 2:
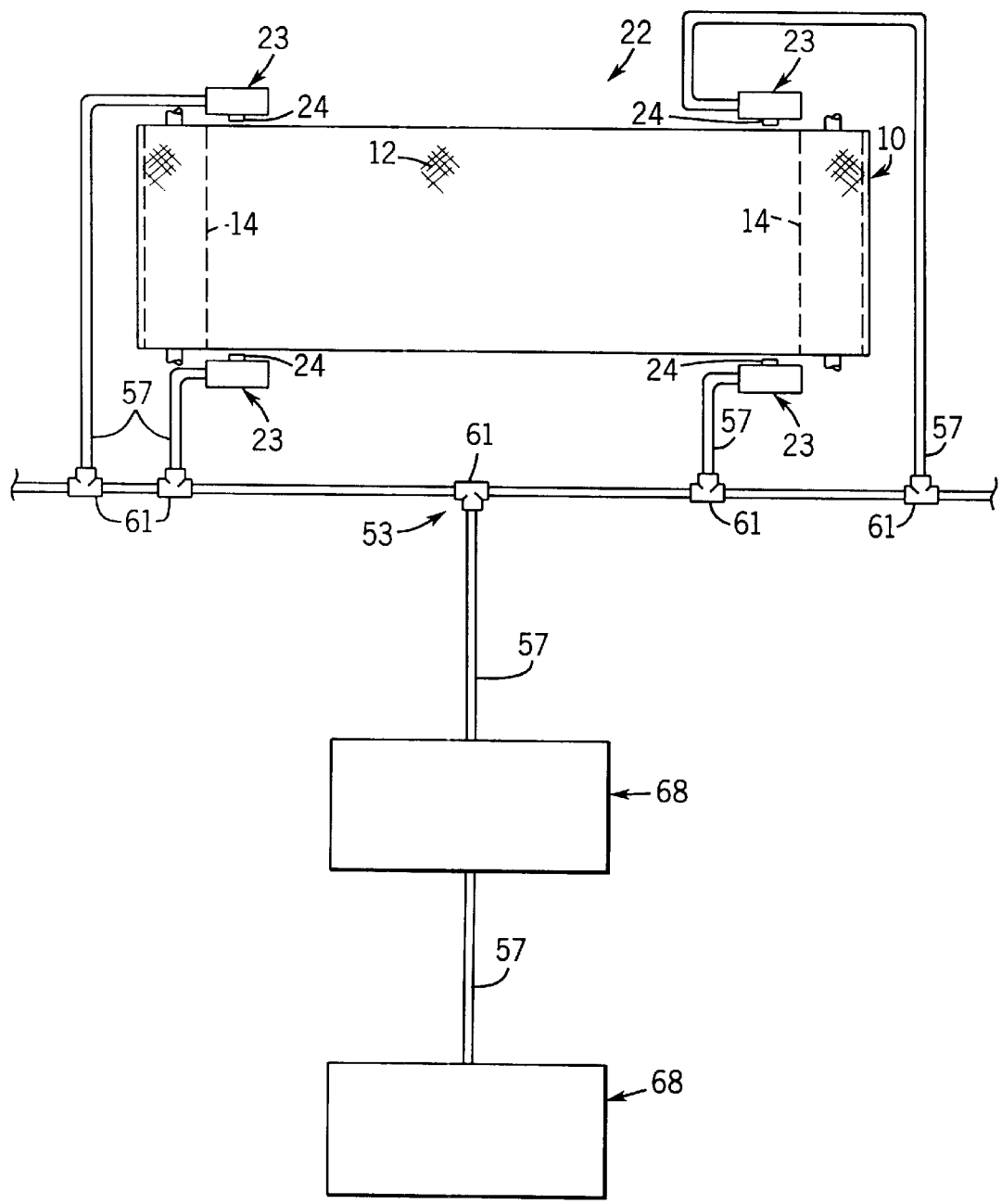
FIG. 2 is a schematic view of the misaligned conveyor belt detection assembly and conveyor belt of FIG. 1.

Referring initially to FIGS. 1 and 2, as is conventional, the conveyor 10 includes an endless belt 12 supported on rollers (one of which is illustrated at 14). When the belt 12 is in its proper or aligned position, the belt 12 is essentially centered on its roller 14 so that its edges 16 are fully contained within lateral sides 18 of the conveyor 10.

A misaligned conveyor belt detection assembly 22 constructed in accordance with a preferred embodiment of the invention comprises at least one misalignment detector 23, positioned adjacent a side of the conveyor 10, that is connected via a communication interface 53 to a controller 68 and a human machine interface 52. In the illustrated embodiment of FIG. 1, two detectors 23 are provided, one adjacent each side 18 of the conveyor 10 mounted via screws 26 to a mounting plate 28. FIG. 2 shows a pair of detectors mounted at two opposite ends of the conveyor 10.

While the mounting plate 28 is preferably made of steel or aluminum, any suitable material may be used. An insulation layer 30, preferably made of a cork material, is disposed below housing 32. The mounting plate 28, insulation 30, and housing 32 are all preferably connected to a frame 34 by bolts 36 and nuts 38. It is desirable to position the detector 23 such that a contact apparatus 24 is sufficiently far away from the conveyor 10 during normal operation to ensure that no accidental contact between the two will occur, but close enough such that contact will occur when conveyor belt 12 becomes misaligned. A distance of 0.5 to 1 inch between the contact apparatus 24 and the associated side 18 of the conveyor 10 is therefore preferred.

A thermocouple 42 is embedded within the contact apparatus 24 in close proximity to an outside wall 40 of the contact apparatus 24 so as to facilitate heat conduction to the thermocouple 42 from the wall. Thermocouple 42 includes two metal wires 44 each composed of a different material and being connected at one end, as is well known in the art. The thermocouple 42 is electrically connected to a network interface 46 via a lead wire 48. An accelerometer 50 is also disposed within the housing 32 and is also connected via a lead wire 49 to the interface 46 to sense vibrations of the housing. While a thermocouple and accelerometer are used in accordance with a preferred embodiment, any device may be used that is capable of sensing temperature and vibration, respectively and outputting signals indicative of the temperature or vibration sensed.

The interface 46 is connected to a human machine interface 52 (HMI) that may be located remotely from the detection assembly 22 via a serial communication network 53 which, in this embodiment, provides both communication capabilities as well as electrical power. The communication network 53 comprises segments 59 of cable connected together by taps 61, and dropline cables 57 located at the taps for connection to devices on the network. An electronic module connector 55 on the housing 32 connects the dropline cable 57 to the network communication interface 72, thereby permitting the interface 46 to communicate on the network 53. The serial communication network 53 is preferably a commercially available DeviceNet® (DeviceNet® is a registered trademark belonging to Allen-Bradley, L.L.C.) communication link.

Figure 3:
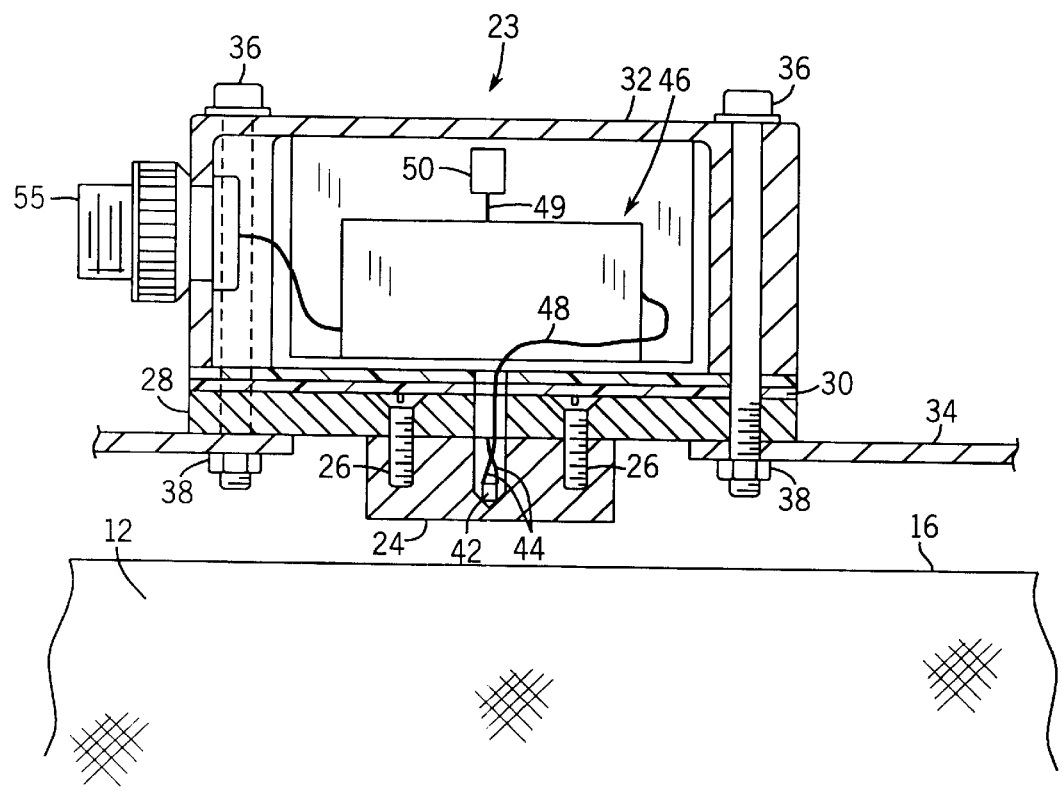
FIG. 3 is a sectional side elevation view of the misaligned conveyor belt detection assembly of FIG. 1.
Figure 4:
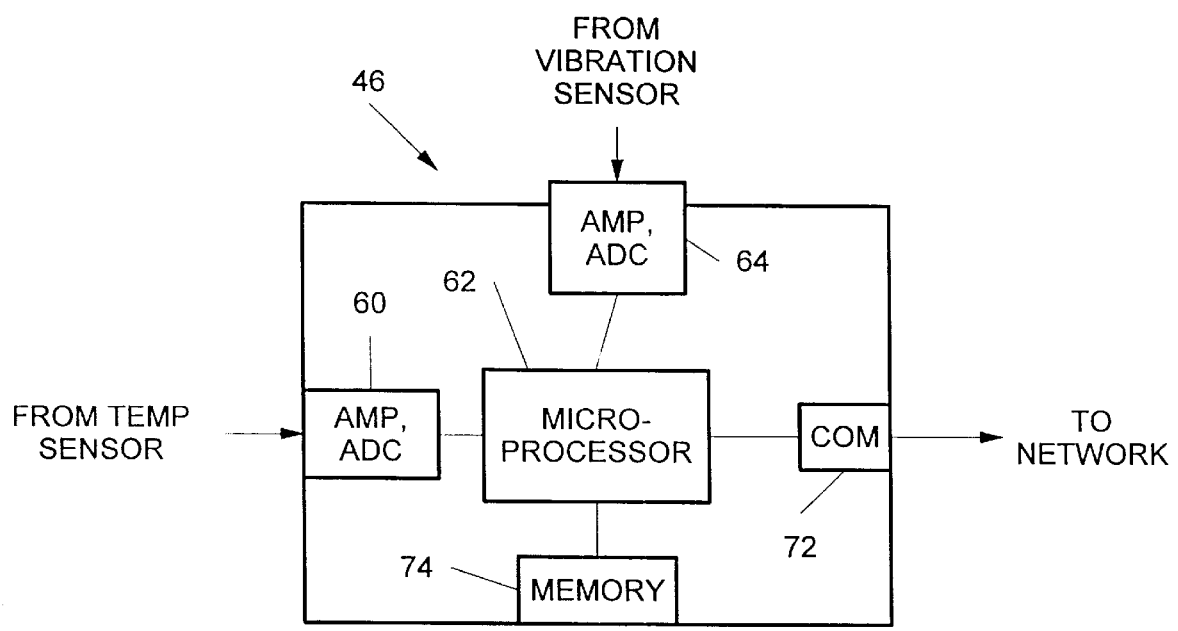
FIG. 4 is an electrical schematic representation of a network interface of the detection assembly.

Referring also to FIG. 3, the contact apparatus 24 is placed in close proximity to the conveyor side 18 to be monitored. If the belt slides laterally with respect to pulleys 14 and becomes misaligned, edge 16 will rub against the contact apparatus 24. This rubbing will generate heat and vibration. The contact apparatus 24 preferably comprises a thermally conductive material, such as a bronze disc, to conduct the generated heat to the thermocouple 42, thereby reducing the time required for sufficient conduction. As is shown in FIG. 4, the thermocouple 42 continually sends an analog voltage output to an amplifier and analog to digital converter 60 (ADC), and the resulting digital signals are then processed by a microprocessor 62 in the interface 46.

Because the housing 32 is in mechanical communication with the contact apparatus 24, the generated vibration of the contact apparatus results in corresponding vibration of the housing 32. The accelerometer 50, mounted inside the housing 32, detects the vibration and outputs an analog voltage signal proportional to the sensed vibration into an amplifier and an ADC 64 (FIG. 4). The corresponding digital vibration signal is then sent to the microprocessor 62 for further processing.

Referring to FIGS. 1 and 2, the HMI 52 is used to change temperature and vibration alarm levels via a keyboard or a mouse. This data is communicated to a controller 68, which processes the input and communicates it to a scanner 70. The data is then sent onto the serial communication network 53 and is received by a network 20 communication interface 72. The data is then transferred to the microprocessor 62 in the network interface 46 to be stored in a memory 74. The controller 68 may be operable to terminate the operation of the conveyor 10 when the belt 12 becomes misaligned.

In operation, threshold temperature and vibration level values, respectively, are input via the HMI 52. The values are then read a card 76 on the controller 68, communicated to the network scanner 70, and sent via the network 53 to the interface 46 to be stored in memory 74.

The threshold values are strategically chosen such that a misaligned conveyor belt will elevate the temperature above room temperature and beyond the chosen threshold value, and would elevate the sensed vibration level beyond that of the level during normal operation and, therefore, beyond the chosen threshold value. Typically, it is desirable to provide a buffer between the normal operation values and the chosen corresponding threshold values. Threshold values of between approximately 10 and 15% above corresponding normal operation values will usually suffice.

In the preferred embodiment, the network interface 46 samples the modified accelerometer signal and temperature signal periodically. The vibration signal is sampled at 4000 Hz, and 2048 samples are stored in the module memory. These samples are then converted to all positive numbers and an average of the samples is calculated. The average can be a simple arithmetic average or an RMS average. The average vibration level is then compared to the alarm values to check whether the belt 12 is misaligned or not.

Alternatively, a commercially available chip can be installed to calculate the RMS average of the vibration levels before being input into the ADC 64. In this embodiment, the microprocessor 62 will compare the manipulated RMS average to the threshold value stored in memory 74 and communicate either a vibration alarm signal or the real-time data to the scanner 70 to be displayed on the HMI 52 to a user.

The temperature reading is also compared to the alarm level to determine whether a temperature rise is occurring. The vibration level and temperature value can be sent periodically to the scanner 70 for the user to display if he/she chooses.

Figure 5:
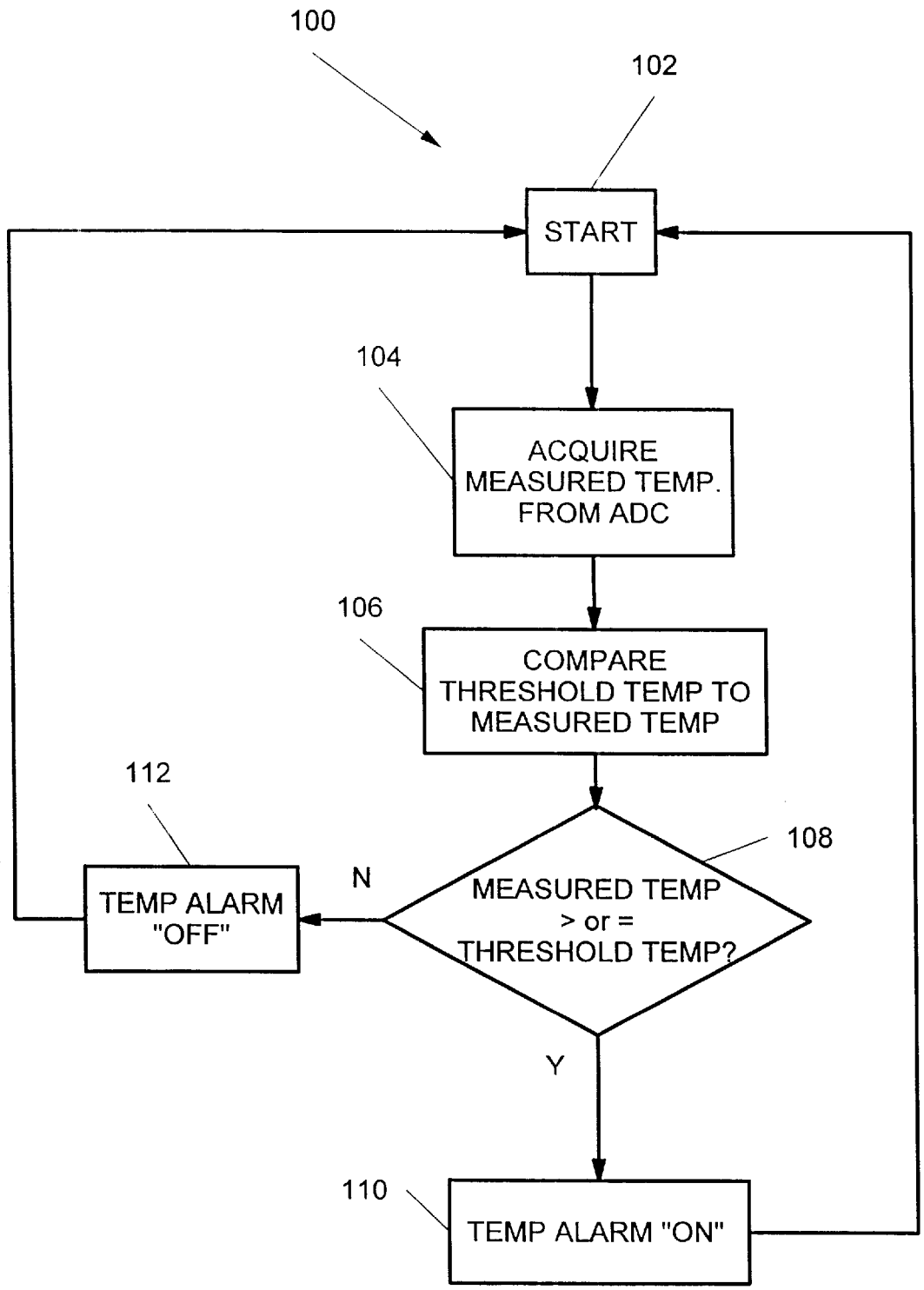
FIG. 5 is a flow chart describing the temperature sensing sequence of the conveyor belt detection assembly of FIG. 1.
Figure 6:
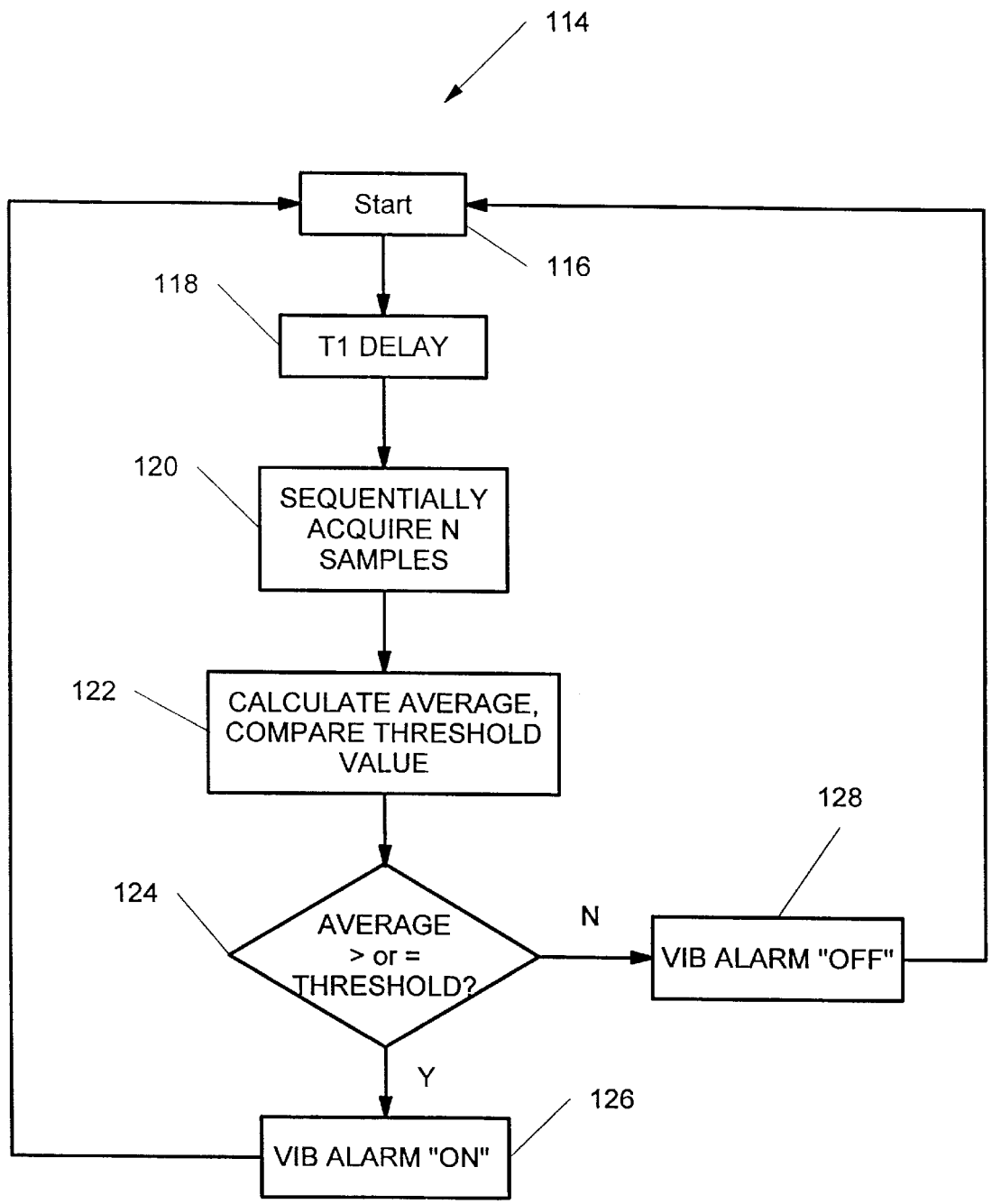
FIG. 6 is a flow chart describing the vibration sensing sequence of the conveyor belt detection assembly of FIG. 1.
Figure 7:
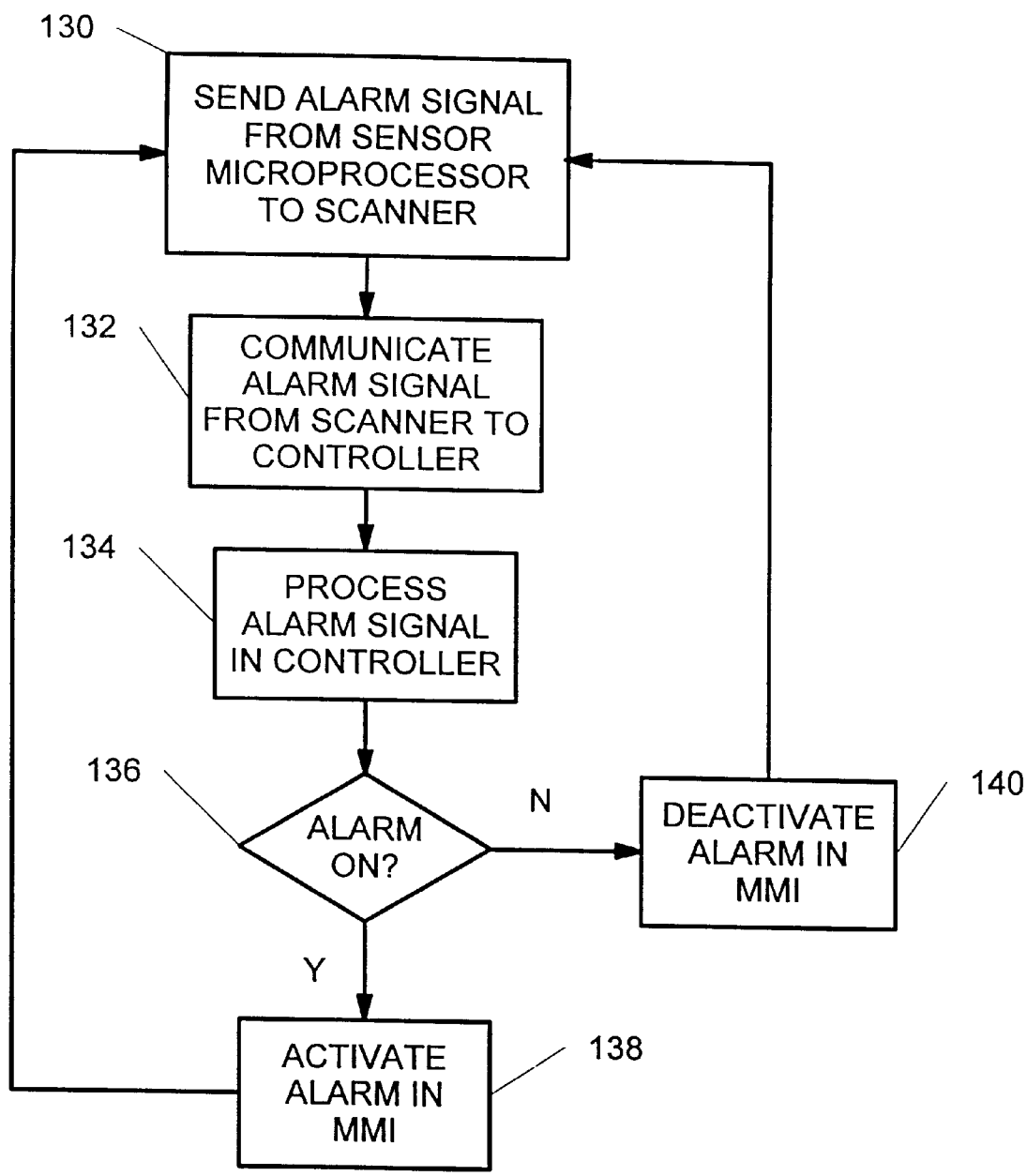
FIG. 7 is a flow chart further describing the general operation of the conveyor belt detection assembly of FIG. 1.

One general scheme of measuring the temperature and vibration values to determine whether the conveyor 10 has become misaligned is shown in FIGS. 5–7. It should be noted that the scheme illustrated in FIGS. 5–7 is just one possible approach, and that other approaches could also be utilized.

Referring specifically to FIG. 5, temperature procedure 100 commences at start step 102, after which the output from the ADC 60 in the form of digital data is input into the microprocessor 46 at step 104. The microprocessor 46 then compares the threshold temperature, already stored in memory 74, to the measured temperature at step 106. If the measured temperature is greater than or equal to the threshold temperature as determined at decision block 108, a temperature alarm "ON" signal is generated at step 110 and subsequently sent over the network 53 to the scanner 70. The alarm signal may, for example, be a flag that is set in a digital message sent from the microprocessor 62 to the scanner 70. If, however, the measured temperature is not greater than or equal to the threshold temperature, a temperature alarm "OFF" signal is generated at step 112 and sent to the scanner 70. The procedure will then revert to start block 102.

The vibration procedure 114 is shown in FIG. 6. After the start block 116, the procedure awaits the expiration of a timer set at a predefined value T1 (approximately 5 seconds in a preferred embodiment) at step 118. Once T1 expires, the microprocessor 62 acquires a predefined number "N" of samples at step 120. Because the microprocessor scans at a frequency of 4000 Hz, N=2048 samples will ensure approximately a 0.5 second sampling interval in accordance with the preferred embodiment. Once all samples have been acquired, the microprocessor 62 converts the values into positive numbers and calculates the average of the sampled vibration values at step 122. If the average of the measured values is greater than or equal to the threshold value as determined at decision block 124, a vibration alarm ON signal is generated at step 126 and sent to the scanner 70. If, on the other hand, the average is not greater than or equal to the threshold value, a vibration alarm OFF signal is generated at step 128 and sent to the scanner 70. The procedure then reverts to start block 116.

FIG. 7 describes generally the manner in which the alarm signals are processed to activate and deactivate temperature and/or vibration alarm indicators on the HMI 52. First, at step 130, an alarm signal is sent to the scanner 70 from the microprocessor 46. Once the scanner receives the data, the data will be communicated to the controller 68 at step 132. The controller 68 will first determine whether the data represents a temperature or vibration alarm signal and will process the signal at step 134 to determine whether the data indicates that the message is an alarm ON or an alarm OFF signal. If the flag is set to indicate that the message is an alarm ON command, as determined at decision block 136, the controller 68 will activate the corresponding alarm indicator on the HMI 52 at step 138. If, however, the flag indicates an alarm OFF command, the controller 68 will ensure that the alarm is deactivated at step 140.

While the above-described sampling technique is not required, it is implemented in the preferred embodiment to minimize possible false misalignment indications that would otherwise occur, for instance, if a user were to accidentally bump into the housing, or if an article on the conveyor belt were to bump into the contact apparatus during operation of the conveyor. Any method of obtaining measured vibration and temperature values that reflect the status of a conveyor belt may be implemented. For example, the vibration protocol could compare instantaneous vibration values to the threshold value to determine if the conveyor belt 24 was misaligned. Additionally, in an alternative embodiment, the microprocessor 62 could send the actual measured temperature and average amplitude values to the microprocessor 68 to be displayed to a user.

In yet another embodiment, the accelerometer 50 could output analog voltage signals corresponding to the vibration frequency (Hz). The user, instead of inputting a threshold maximum amplitude value, would input a minimum frequency. For example, the user could determine the frequency of the housing under normal conditions by one of any known method, and subsequently calibrate the threshold frequency to be less than the frequency under normal conditions, such that the average measured frequency value would fall below the threshold frequency value when the conveyor belt is in mechanical communication with the contact apparatus 24. Additionally, a more complex system could be implemented that would recognize the frequency waveform produced under normal operating conditions. Therefore, when the conveyor belt is in mechanical communication with the contact apparatus 24, the processor would recognize a deviation from the normal waveform and determine that the conveyor belt has become misaligned.

The starter of the conveyor motor could also be connected to the network 53 such that a processor, and preferably controller 68, may also be used to automatically shut down the conveyor 10 when predefined status of the temperature and vibration alarms 78, 80 exist. Alternatively, a user could manually activate a conveyor belt power switch on the HMI 52 when the temperature and/or vibration alarms 78, 80 are activated.

To perform diagnostics on the detection assembly 22, thereby ensuring that it is operating properly, the temperature and amplitude threshold values may be lowered to values that would activate the respective alarm during normal operation. For example, the threshold temperature would be reduced to a level below room temperature, and/or the threshold amplitude would be reduced to a level less than the amplitude of the frequency when operating under normal conditions. Therefore, if the corresponding alarms 78, 80 activate, the user will be assured that the system is functioning properly, and can then return the threshold values to their normal levels of operation. The threshold levels can also be adjusted as needed to maximize the efficiency of the protocol 100.

Many other changes and modifications may also be made to the invention without departing from the spirit thereof. The scope of these changes will become apparent from the appended claims.

I claim:

1. A method of sensing misalignment of a conveyor, the method comprising:
    (A) placing a conveyor in mechanical communication with a misalignment detection apparatus to generate a measured vibration level;
    (B) comparing said measured vibration level to a threshold vibration level; and
    (C) determining, based upon the comparing step, whether the conveyor is misaligned.

2. The method of claim 1, wherein step (C) further comprises determining that the conveyor is misaligned when said measured vibration level is greater than said threshold vibration level.

3. The method of claim 1, further comprising calculating an average of a plurality of said measured vibration levels after step (A), and determining that the conveyor is misaligned when said average is outside said threshold vibration level.

4. The method of claim 1, further comprising:
    placing a vibration sensor in mechanical communication with said misalignment detection apparatus to generate said vibration signal during step (A); and
    calculating said measured vibration level based on said generated vibration signal.

5. The method of claim 4, further comprising:
    inputting said threshold vibration level into a first interface;
    communicating said threshold vibration level from said first interface to a second interface; and
    measuring said vibration signal from said vibration sensor in said second interface.

6. The method of claim 5, further comprising:
    generating and displaying indicia that indicate that said measured vibration level is outside of said threshold vibration level.

7. The method of claim 1, further comprising:
    producing a measured temperature level after said placing step;
    comparing said measured temperature level to a predetermined temperature level; and
    determining, based on the step of comparing said measured temperature level to the predetermined temperature level, whether the conveyor belt is misaligned.

8. The method of claim 7, further comprising
    placing a temperature sensor in thermal communication with said misalignment detection apparatus to produce said temperature signal; and
    generating and displaying indicia to indicate that said measured temperature level exceeds said predetermined temperature level.

9. A method for detecting a misaligned conveyor belt comprising:

(A) inputting a threshold value into a first interface;

(B) communicating said threshold value to a second interface;

(C) placing a conveyor belt in contact with a misalignment contact apparatus to produce a measured value; and (D) comparing said measured value to said threshold value and determining, based on the comparison, whether the conveyor belt is misaligned.

10. The method of claim 9, further comprising confirming that said method for detecting a misaligned conveyor belt is operational by adjusting said threshold value until a signal is generated indicating that the conveyor belt is misaligned.

11. The method of claim 9, wherein said threshold value and said measured value are one of a vibration value and a temperature value.

12. A conveyor belt misalignment detector assembly comprising:

a misalignment contact apparatus that is in operative communication with a conveyor belt when said conveyor belt is misaligned;

a housing in mechanical communication with said misalignment contact apparatus;

a sensor in one of mechanical and thermal communication with said misalignment contact apparatus to generate a signal when said belt contacts said misalignment contact apparatus; and a network interface connected to said sensor and configured to compare said measured level to a threshold level.

13. The assembly of claim 12, further comprising a second interface configured to receive a threshold as input, and a communication network to communicate said input from said second interface to said network interface.

14. The assembly of claim 12, wherein said measured level and said threshold level comprise one of a temperature value and an amplitude value.

15. The assembly of claim 14, wherein said sensor comprises one of a thermocouple and an accelerometer.

16. The assembly of claim 12, wherein said misalignment contact apparatus comprises a bronze disc.

17. A method for detecting a misaligned conveyor comprising:

(A) placing a conveyor in thermal communication with a misalignment detection apparatus to generate a temperature signal;

(B) producing a measured temperature level in a first interface based on said temperature signal;

(C) communicating a threshold temperature level from a second interface to said first interface over a communication network; and (D) determining whether the conveyor is misaligned.

* * * * *